United States Patent [19]

Ganguly et al.

[11] Patent Number: 6,135,241
[45] Date of Patent: Oct. 24, 2000

[54] AXLE HOUSING WITH A DEFLECTOR

[75] Inventors: Anand Moi Ganguly; William John Hamm, both of Fort Wayne, Ind.

[73] Assignee: Dana Corporation, Toledo, Ohio

[21] Appl. No.: 09/256,182

[22] Filed: Feb. 24, 1999

[51] Int. Cl.$^7$ ...................................................... F01M 9/06
[52] U.S. Cl. ....................... 184/11.1; 184/6.12; 184/13.1; 74/607
[58] Field of Search ................... 184/13.1, 6.12, 184/11.1, 11.4; 74/607

[56] References Cited

U.S. PATENT DOCUMENTS

| | | | |
|---|---|---|---|
| 1,388,397 | 8/1921 | Zimmerman | ............................... 74/607 |
| 4,244,242 | 1/1981 | Uno et al. . | |
| 4,625,581 | 12/1986 | Hull . | |
| 5,316,106 | 5/1994 | Baedke et al. . | |
| 5,540,300 | 7/1996 | Downs et al. . | |
| 5,839,327 | 11/1998 | Gage | ........................................ 74/607 |

*Primary Examiner*—David Fenstermacher
*Attorney, Agent, or Firm*—Liniak, Berenato, Longacre & White

[57] ABSTRACT

A deflector for an axle housing to deflect circulated oil towards the oil galleries. Preferably, the deflector is formed as an indentation of a cover plate of the axle housing and is positioned adjacent the ring gear of a differential. When the ring gear rotates, oil is picked up from a reservoir and is directed toward the deflector. Oil is in turn deflected outwardly toward the oil galleries proximate the bearing caps to supply lubricating oil to the axle shafts and wheel end bearings. This arrangement has proved to eliminate wheel end bearing oil starvation at vehicle speeds as low as 24 mph.

5 Claims, 3 Drawing Sheets

AXLE HOUSING WITH A DEFLECTOR

BACKGROUND OF THE INVENTION

1. Field of the Invention

The present invention is directed to a deflector and is more particularly directed to a deflector formed in an axle housing to deflect oil circulated from the ring gear.

2. Summary of the Prior Art

In a differential axle assembly the differential is provided with a pair of side journals which are rotatably supported by a pair of spaced bearing and bearing caps carried on the transaxle differential housing. A pair of axle shafts extend outwardly from the differential unit through the bearings and bearing caps. In operation, the ring gear picks up oil form the lower reservoir to circulate the lubricating oil to lubricate the differential. However, as often is the case, insufficient lubricating oil is directed to the oil galleries behind the bearing caps and onto the axle shafts and finally to the wheel end bearings. This is primarily caused because the lubricating oil picked up and circulated by the ring gear mainly flows proximate the ring gear and falls directly back into the lower reservoir. The result is an undesirable distribution of lubricating oil to the bearing cap oil galleries and consequently the outwardly extending axle shafts.

SUMMARY OF THE INVENTION

A deflector for an axle housing deflects oil circulated by the ring gear outwardly to the oil galleries behind the bearing caps. Preferably, the deflector is formed as an indentation in a cast or stamped one piece cover for the axle housing. The indentation, preferably substantially v-shaped in cross section, is positioned adjacent the top portion of the ring gear to deflect circulated oil outwardly. The cover plate and deflector, together, enhance the distribution of oil to the oil galleries thus providing a source of lubricating oil to the outwardly extending axles and wheel end bearings.

DESCRIPTION OF THE PREFERRED EMBODIMENT

Figure 1:
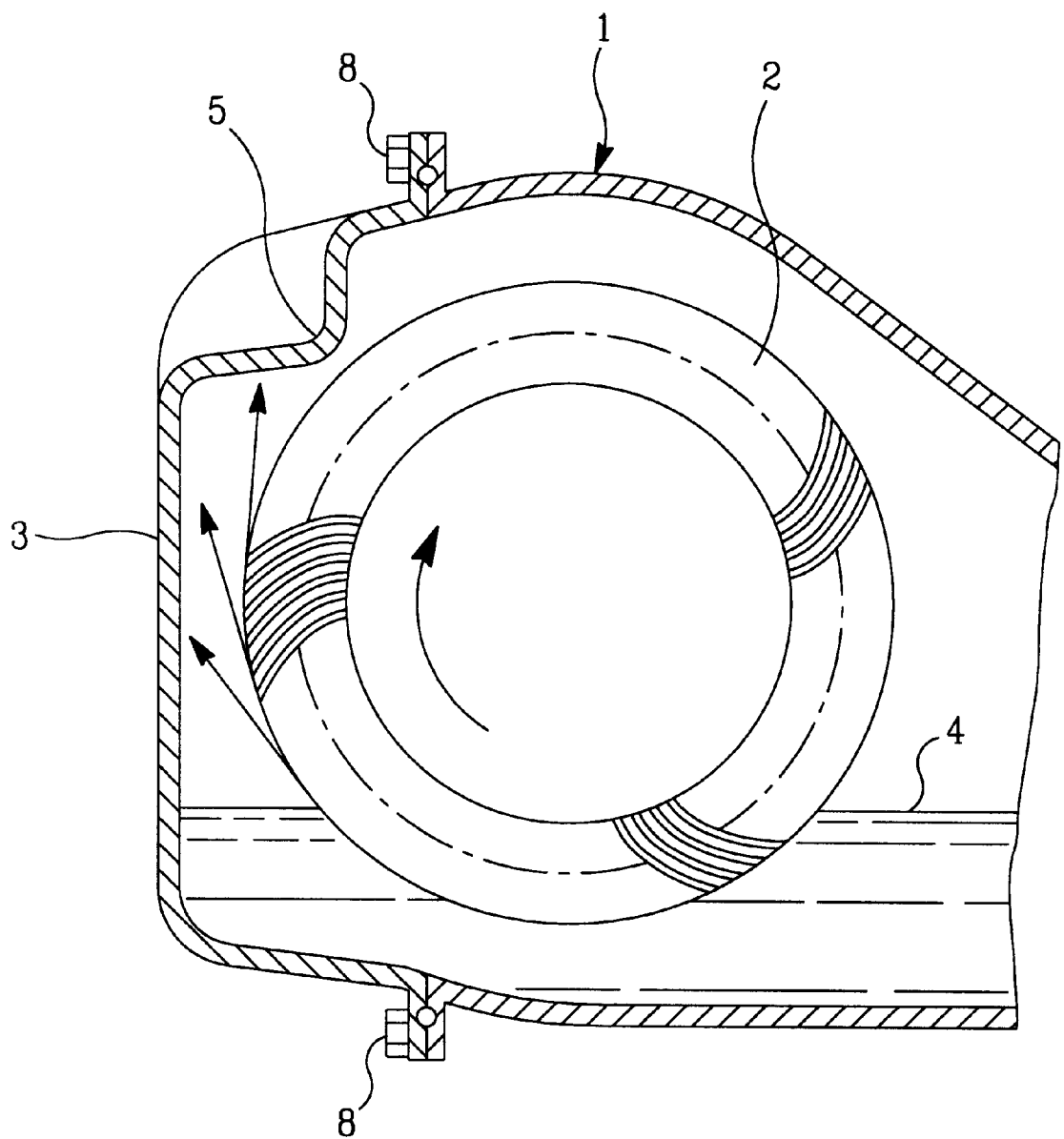
FIG. 1 is a cross sectional view of deflector of the preferred embodiment of the instant invention.

FIG. 1 depicts a housing 1 containing a differential assembly having a rotatably mounted ring gear 2. The housing 1 is enclosed by a cover plate 3. A reservoir of lubricating oil 4 collects at the bottom of the housing for the purpose of lubricating the differential and axle shaft wheel end bearings 8, by riding on the axle shafts 7. The ring gear 2 is partially disposed within the oil reservoir so that when the ring gear 2 rotates, lubricating oil 4 is directed upward as indicated by the arrows. Ordinarily, the lubricating oil splashes around the differential assembly and falls directly to the bottom of the reservoir. Cover plate 3 has an integrally formed deflector 5 formed in a top portion adjacent the ring gear 2. The deflector 5 is preferably v-shaped in cross section. The angle and precise shape of the deflector is developed particularly the model size of the axle housing. The size of the carrier, as well as the presence/absence of internal components eg. tone wheels etc. will effect the angle and shape of the V-shaped deflector in order to diver oil to the oil galleries situated behind the bearing caps. The cover plate 3 and deflector 5, are mounted to the housing 1 by bolts 8 or other conventional mounting to sealingly close the housing 1 containing the differential and oil there within. Oil circulated by the ring gear is deflected by the deflector outwardly toward the axle shaft 7 and oil galleries proximate the bearing caps.

Figure 2:
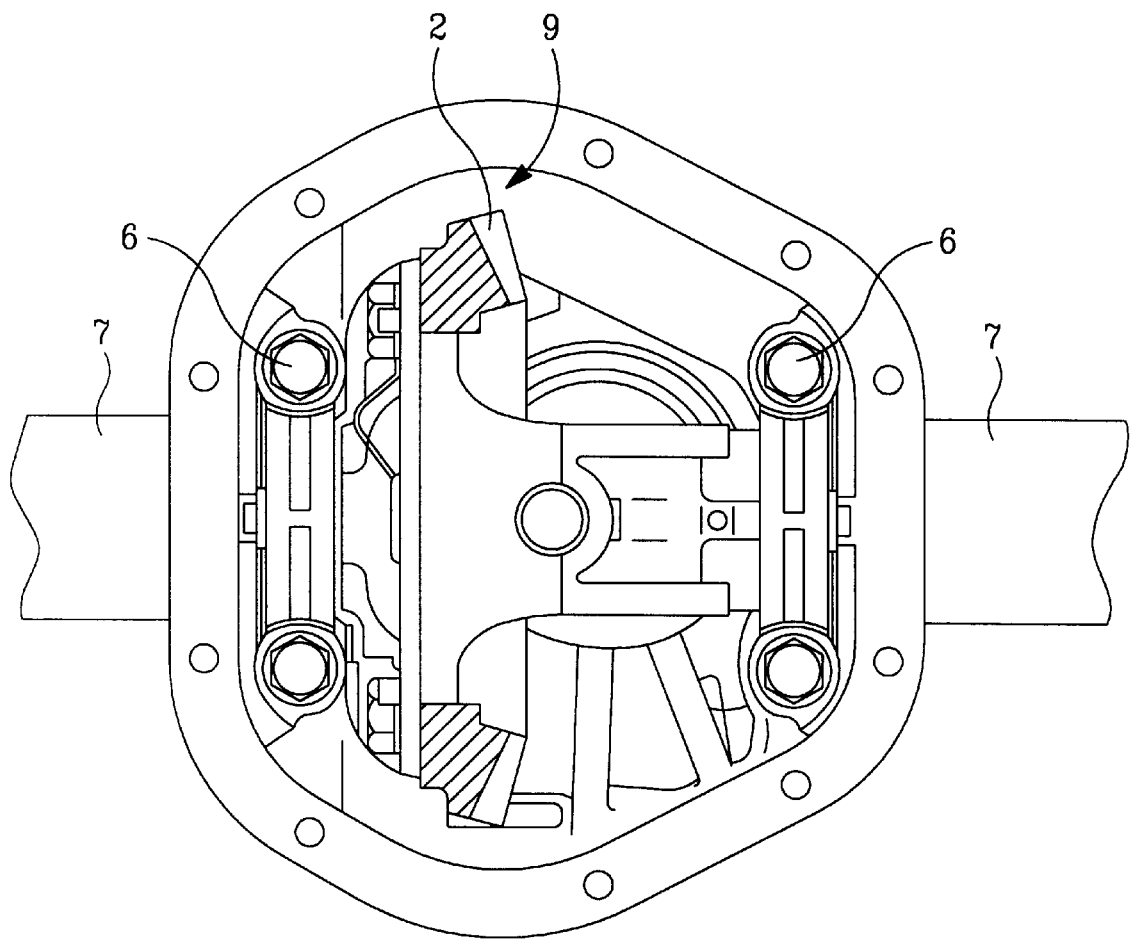
FIG. 2 is a rear view of a differential assembly and housing to which the present invention is adapted to deflect oil.

FIG. 2 represents a rear view of the differential housing without the cover plate. The differential assembly is exposed along with the ring gear 2. Bearing caps 6 contain bearings which rotatably support outwardly extending axle shafts 7 which extend from the differential assembly. To facilitate lubrication, the bearing caps and bearing assemblies are provided with oil galleries to allow oil to communicate to the axle shaft wheel end bearings 8 through axle shafts 7. This configuration may be one conventionally found within the art. Prior art assemblies do not provide sufficient oil to the oil galleries to properly lubricate the wheel end bearings 8 and axle shafts 7. Therefore, the present invention provides a deflector to deflect circulated oil to the oil galleries. In the preferred embodiment, the cover plate 3 contains the deflector 5 positioning the deflector 5 adjacent the ring gear to outwardly direct oil toward the oil galleries to enhance lubrication of the axle shaft wheel end bearings 8 and axle shafts 7. Reference numeral 9 indicates the desired position of the apex of the deflector 5. Preferably, the apex of the deflector 5 is located just above the top of the toothed portion of the ring gear 2. However, in differentials having tone wheels for sensing speed, the deflector could be positioned proximate the tone wheel so long as the tone wheel circulates sufficient oil. The deflector may also be positioned at a lower portion. However, the most desired position is atop the ring gear.

Figure 3:
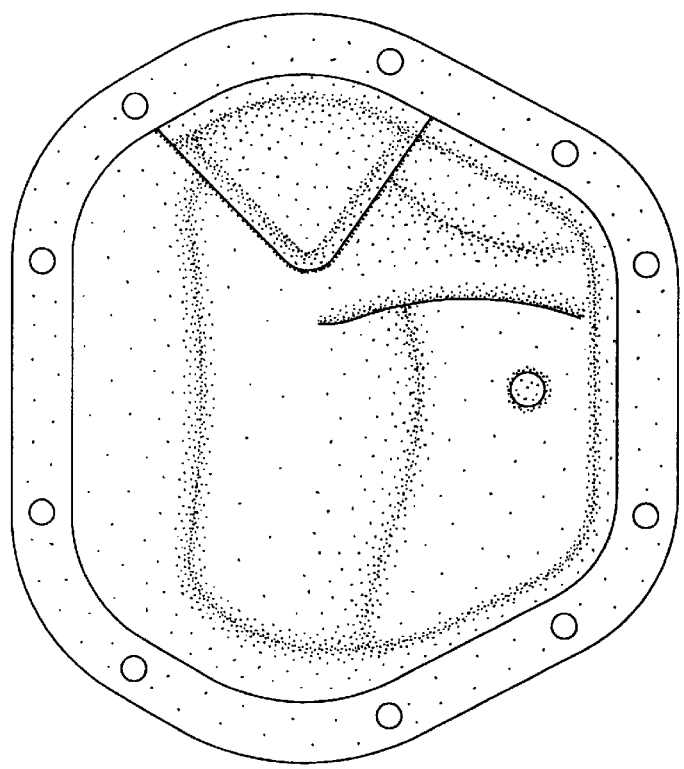
FIG. 3 is a rear view of an axle housing comprising the deflector of the present invention.

FIG. 3 is a rear view of the cover plate of the preferred embodiment clearly depicting the external shape. The deflector 5 is formed as an indentation of the unitary cover plate.

Figure 4:
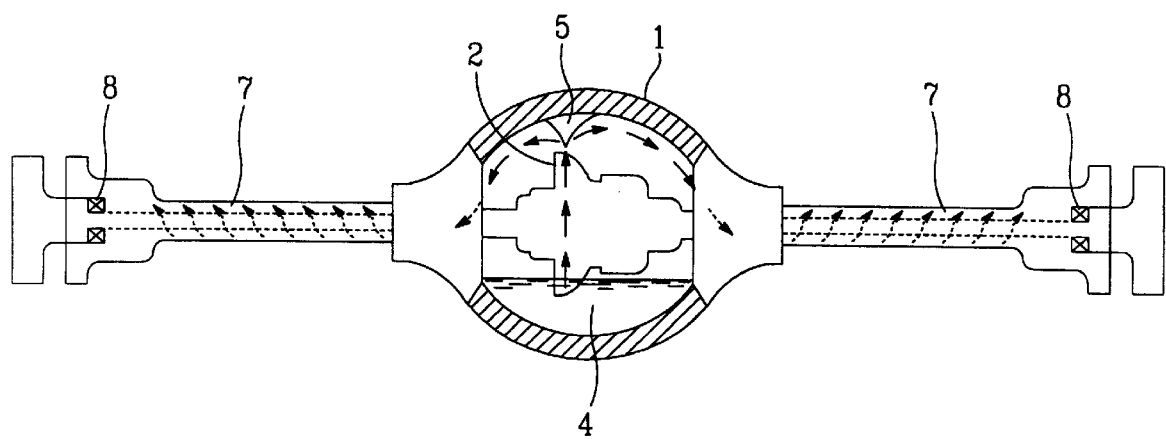
FIG. 4 is a partial cutaway view of a differential and axle assembly depicting the oil deflecting off the deflector formed in the housing.

FIG. 4 is a partial cutaway view of the axle housing and axle assembly. The view is taken looking towards the pinion to reveal the deflector portion. As the ring gear 2 rotates, oil is lifted upwards from the reservoir toward the deflector 5. The deflector 5 in turn directs the circulated oil outwardly toward the oil galleries located behind the bearing caps and onward to the outwardly extending axle shafts 7. The arrows indicate the flow path of the deflected oil as the ring gear rotates. This arrangement has been demonstrated to enhance lubrication of the both the left and right axles and improve lubrication to wheel end bearings 8, therefore eliminating oil starvation, at vehicle speeds as low as 24 mph. Actual vehicles incorporating the cover plate of the present invention have demonstrated sufficient wheel end bearing lubrication at vehicles speeds as low as 16 mph. FIG. 4 reveals the substantially v-shaped cross-section of the deflector 5.

The exact shape of the cover plate 3 must accommodate the various parts of the differential and axle assembly. Therefore, different dimensioned cover plates are contemplated for different differential housing assemblies. However, a deflector may be formed in cover plates for these different housings.

In the preferred embodiment the cover plate is unitarily stamped from a sheet of steel. However, the cover plate may be cast of aluminum as well. While the foregoing invention has been shown and described with reference to a preferred embodiment, it will be understood by those possessing skill in the art that various changes and modifications may be made without departing from the spirit and scope of the invention. For example, the preferred embodiment of the present invention contemplates forming the deflector as an indentation in a unitary stamped cover plate. However, the deflector can be formed directly on the housing apart from the cover. A deflector may be also formed separately and adhered, welded or otherwise fastened to the interior of the cover plate or housing. However, this embodiment is not preferred. Moreover, the thickness of the cover plate or housing can be varied to form the deflector portion rather than forming an indentation; the outside contour need not reveal an indentation. Therefore, other types of deflectors formed on the cover plate or housing that direct circulated oil toward the oil galleries are contemplated as falling within the sprit and scope of the present invention.

What is claimed is:

1. An axle housing for containing a gear assembly, a pair of axle shafts extending laterally outwardly in opposite directions from the housing and a lubricating oil circulated by said gear assembly, said axle housing comprising:
   a deflector secured to said housing and adapted to deflect said lubricating oil laterally outward toward said shafts; and
   said gear assembly including a differential assembly having a ring gear, said ring gear causing said lubricating oil to circulate when rotated, wherein said defector is formed in a top portion of said housing and positioned adjacent a top portion of said ring gear such that said deflector deflects said lubricating oil downward outwardly along an inner surface of said housing down toward said axle shafts.

2. A combination differential assembly, axle assembly and housing, wherein;
   said differential assembly mounted within said housing and including a rotatable ring gear;
   said axle assembly including a pair of axle shafts attached to said differential and extending outwardly therefrom in opposite directions and secured to said housing by a pair of bearing caps, said axle assembly having a pair of oil galleries located behind each of said bearing caps to facilitate lubrication of said axles;
   said housing having an opening to facilitate the assembly of said differential assembly and axle assembly therein, said housing having an oil reservoir disposed in a lower portion such that said ring gear is partially disposed therein, said housing comprising a cover plate secured to said opening to sealingly contain said oil within said housing, said cover plate having a deflector formed in a top portion adjacent said ring gear and a top portion of said housing, said deflector being an indentation formed in said cover plate having a substantially v-shaped cross section, said deflector adapted to deflect oil circulated by said rotating ring gear along said top portion of said housing and outwardly along an inner surface of said housing to said oil galleries thereby lubricating said axles.

3. An axle housing for containing a gear assembly, a pair of axle shafts extending laterally outwardly in opposite directions from the housing, and a lubricating oil circulated by said gear assembly, said axle housing comprising:
   a deflector secured to said housing and adapted to deflect said lubricating oil laterally outward toward said shafts, wherein said gear assembly includes a differential assembly having a ring gear, said ring gear causing said lubricating oil to circulate when rotated, wherein said defector is positioned adjacent said ring gear and said deflector is unitarily formed as an inwardly directed v-shaped indentation of said housing.

4. The axle housing according to claim 3, wherein said deflector is formed on a cover plate of said housing.

5. A cover plate for distributing oil to an axle assembly of a motor vehicle, said axle assembly having a housing containing a differential and a pair of axle shafts extending outwardly from said differential in opposite directions and disposed through a pair of bearing caps, said assembly having an oil gallery located behind each bearing cap to facilitate lubrication of said axle shafts, said differential having a ring gear rotatably mounted within said housing and partially disposed within an oil reservoir such that when said ring gear rotates oils is circulated towards a top portion of said housing, said housing having an opening to facilitate assembly of the differential and axle assembly, said cover plate comprising;
   a mounting means for securing said cover plate to said housing thereby sealingly closing said housing and containing said oil therein,
   a deflector adapted to deflect circulating oil to said oil galleries thereby lubricating said axle shafts, said deflector being formed in a top portion of said cover such that when said cover is mounted to said housing, said deflector is positioned adjacent said top portion of said housing and adjacent a top portion of said ring gear such that when said ring gear rotates oil is circulated towards said deflector and is deflected outwardly along said top portions of said cover and housing and along an inner surface of said housing down towards said oil gallery.

\* \* \* \* \*